Nov. 11, 1952  F. F. MILLER, JR  2,617,279
LUBRICATING DEVICE FOR UNIVERSAL JOINTS
Filed Nov. 3, 1947  2 SHEETS—SHEET 1

INVENTOR.
FRED F. MILLER JR.
BY
Whittemore Hulbert & Belknap
ATTORNEYS

Nov. 11, 1952     F. F. MILLER, JR     2,617,279
LUBRICATING DEVICE FOR UNIVERSAL JOINTS
Filed Nov. 3, 1947     2 SHEETS—SHEET 2

INVENTOR.
FRED F. MILLER JR.
BY
Whittemore Hulbert & Belknap
ATTORNEYS

Patented Nov. 11, 1952

2,617,279

UNITED STATES PATENT OFFICE 2,617,279

LUBRICATING DEVICE FOR UNIVERSAL JOINTS

Fred F. Miller, Jr., Berkley, Mich., assignor to The Gear Grinding Machine Company, Hamtramck, Mich., a corporation of Michigan Application November 3, 1947, Serial No. 783,799

2 Claims. (Cl. 64—21)

The invention relates to universal joints of a type in which working parts are located close to the axis of the joint. More particularly, the invention relates to a type of torque transmitting universal joints in which there is a tie connection between the torque transmitting members located in the axis of the joint and itself having a non-torque transmitting universal joint therein. It is the object of the invention to obtain a construction in which the working parts located adjacent to the axis are maintained well lubricated at all times. It is customary to enclose universal joints in a lubricant holding housing. If, however, the joint is rotated at fairly high speed centrifugal force will drive the lubricant away from the axis and any bearings located adjacent thereto which may result in failure of the joint.

While my improvement may be applicable to different specific constructions of universal joint, I have illustrated a particular construction in the drawings in which Fig. 1 is a longitudinal section through a joint of my improved construction;

Figure 1:
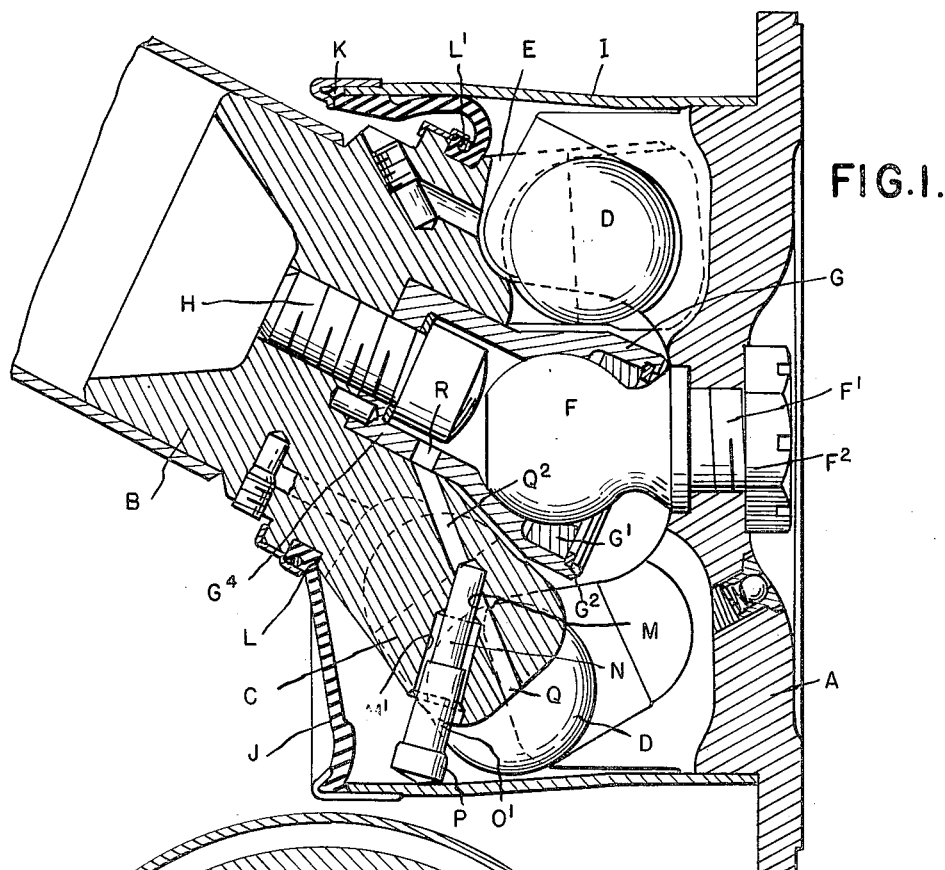
Figure 3:
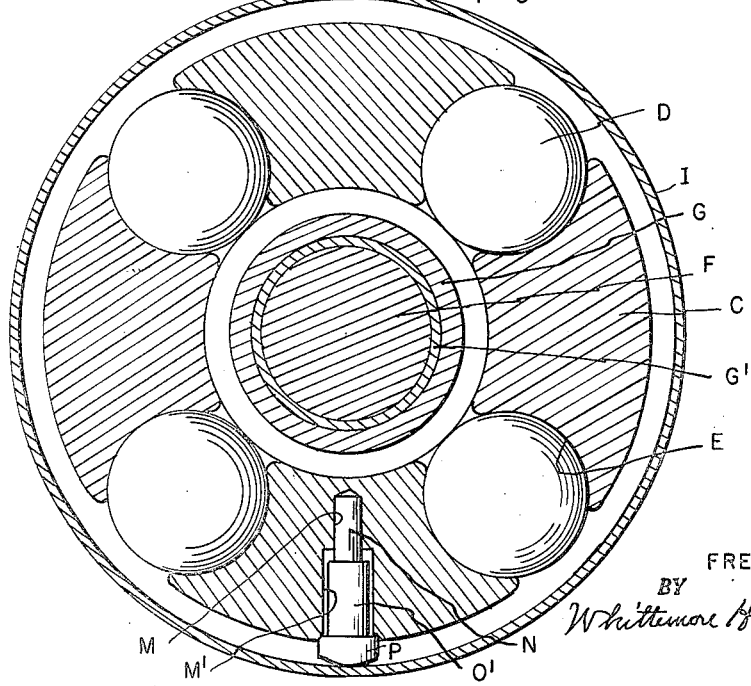
Fig. 3 is a cross section.

The specific construction of torque transmitting universal joint illustrated comprises a pair of members A and B connected, respectively, to the shafts or other rotating parts. These members are provided with axially extending interspersed lugs C having torque transmitting balls D therebetween. The opposite faces of the lugs C in the two members are fashioned to form grooves E for receiving and embracing the balls D, said grooves being inclined at a predetermined angle to the axis of its corresponding member. As specifically shown, the axis of each of the grooves is at an angle of 28° to the axis of the shaft so that the grooves in the opposite faces are oppositely inclined with respect to each other. Assuming that the two members move angularly with respect to each other about a fixed intersecting point in the axis thereof, the balls will be maintained always in a plane which bisects the angle between these axes and thus torque is transmitted at constant velocity. It is, however, essential to maintain the members A and B in fixed relation to this point of intersection of their axes, which is accomplished by a tie connection. This, as shown, comprises a ball member F having a threaded shank F' connected to the member A by a nut F². Also a spherical socket member G for receiving the ball which has an annular bearing retaining member G' secured to the socket by a snap ring G². The socket G has a shank G⁴ engaging a corresponding recess in the member B and secured thereto by a bolt H. The parts are so located that the center of the ball is the fixed center about which the shaft members oscillate in the operation of the joint.

To retain the lubricant for the joint, the member A is provided with a cylindrical rigid housing member I which extends therefrom concentric with its axis beyond the interengaging lugs and balls. The outer end of this casing I is connected to the member B through the medium of a flexible annular member J of return bent cross section. The outer portion of this member has secured thereto, preferably by vulcanizing, a sleeve member K which telescopes over the member I to secure the member J thereto. The inner periphery of the member J engages an annular groove L in the member B and is secured therein by a metallic ring L'. Thus the space surrounding the working parts of the universal joint is completely enclosed by the members I and J and the flexing of the latter element permits angular oscillation of the member B about the fixed center.

The construction as thus far described is not the subject matter of the instant invention and has been previously used. It has been found, however, that when the joint is rotating centrifugal force will impel the lubricant radially outward from the axis of the joint and from the bearing surface of the ball F and socket G. Consequently, seizure between these parts may take place wtih destructive results. To overcome this defect I have devised a construction for forcing the lubricant radially inward against the opposition of centrifugal force and into the socket member G.

Figure 2:
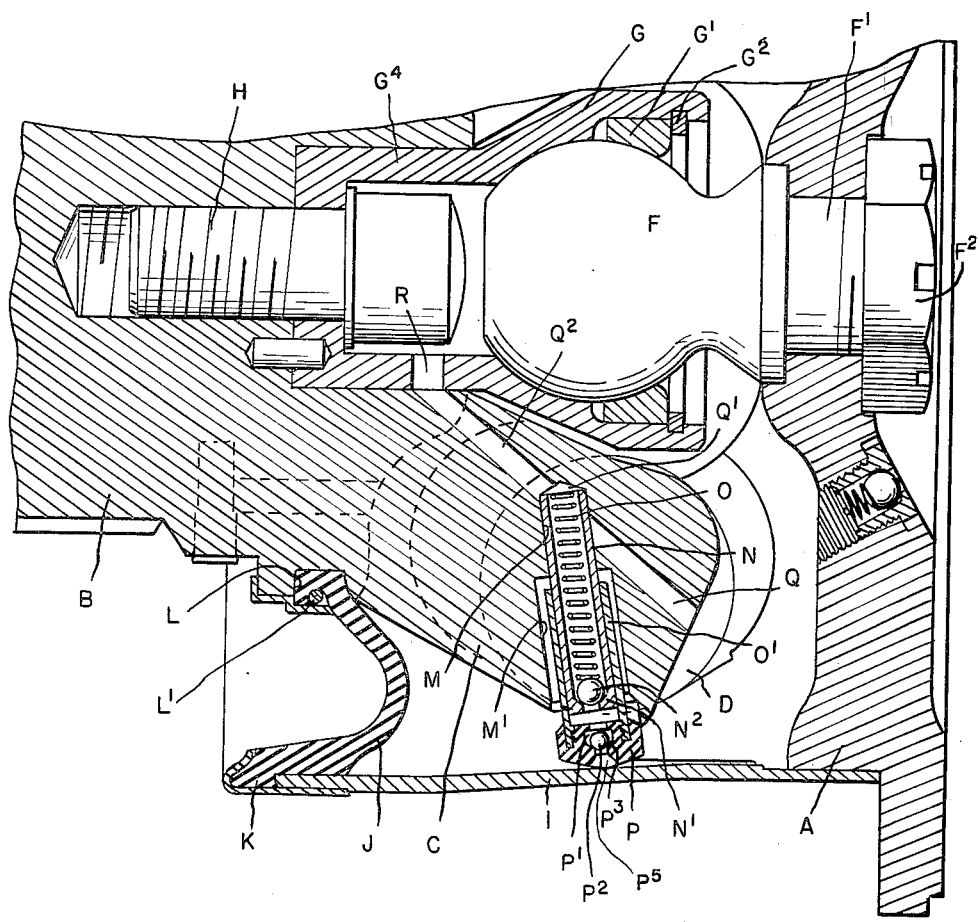
Fig. 2 is a similar view of a portion of Fig. 1.

As illustrated one of the lugs C has a radially extending bore M therein with a counterbore M' in its outer portion. Located in the bore M and extending outward in the counterbore M' is a tubular member N which at its outer end is provided with a valve seat N' for an inwardly opening ball check valve N². This valve is normally held to its seat by a spring O arranged within the tube N. Telescopically engaging the outer surface of the member N is a tubular member O'. This at its outer end has secured thereto a cap member P, preferably formed of synthetic rubber. Centrally within the cap member is a recess P' in which is located a ball check valve P² engaging a seat P³. The cap P has a slightly conical upper surface which forms a shoe for bearing against the inner surface of the casing I and sliding thereover during the angular movement of the axis of the member B. In the position shown in Fig. 1 the axis of the member B is at the maximum angle to the axis of the member A, but during the rotation of the joint through 90° the shoe will move into the common plane of the axis A and B approaching the longitudinal center of the casing I, as shown in Fig. 2. This will move the member O radially inward in its telescopic movement on the member N. In the same manner a rotation through 270° will return the parts into the position shown in Fig. 1. Another bore Q formed in the lug C intersects the bore M and when the tube N is in position it will be in communication through a port Q' with the inner portion $Q^2$ of this bore Q. The bore Q registers with a radial bore R in the socket G so as to be in communication with the interior of said socket. Thus during the rotation of the joint the structure just described constitutes a pump which receives lubricant thrown outward by centrifugal force against the casing I, passing inward through the check valve $P^2$ and into the chamber $O^2$ within the member O'. During movement from the position in Fig. 1 to that in Fig. 2, the lubricant in the chamber $O^2$ will be forced radially inward beyond the check valve $N^2$ through the tube O', port Q' and bores Q and R into the space within the socket G. It will then be forced between the surfaces of the ball F, socket G and bearing G' maintaining these parts at all times thoroughly lubricated.

The pump construction above described adds very little to the cost of the universal joint, involving only, first, the forming of bores M, M', Q and R; second, the construction of the metallic members N and O', the balls $M^2$ and $P^2$ and spring O; and third, the cap and shoe member P which can be molded from synthetic rubber. This member is provided with a flaring slot $P^5$ which extends outward from the valve seat $P^3$ to provide open communication entrance for the lubricant in all positions of angular relation of the joint.

What I claim as my invention is:

1. In a universal joint, comprising a pair of members having axially extending interspersed lugs for transmitting torque therebetween, an axially arranged tie connection between said members having a non-torque transmitting universal joint at the center thereof, a lubricant containing casing enclosing said members having a portion rigid with the one and a flexible portion between the same and the other member, one of the lugs of the latter member being provided with a substantially radially extending recess therein, a pump located in said recess and having the actuating member thereof extending into contact with the rigid portion of said casing to be reciprocated thereby in the relative oscillation of said members, said pump having a suction connection adjacent to said casing, and a delivery connection to said non-torque transmitting universal joint.

2. In a universal joint, comprising a pair of members each having a pair of axially extending lugs upon opposite sides of the axis thereof with a space therebetween, the lugs of the two members being interspersed for the transmission of torque from one member to the other, an axially extending tie connection between said members in the space between said lugs, said tie connection having a non-torque transmitting universal joint at the center thereof, a lubricant containing casing enclosing said torque transmitting lugs and having one portion rigid with one of said members and another portion forming a flexible connection between said rigid portion and the other of said members, one of the lugs of the latter member being provided with a substantially radially extending bore therein and with an intersecting bore leading to said non-torque transmitting universal joint, a reciprocatory cylinder and piston pump located in said radial bore and having one of its members fixed to said lug and the other extending into contact with the rigid portion of said casing whereby in the relative oscillation of said members said pump will be actuated to propel lubricant radially inward against centrifugal force to lubricate said non-torque transmitting universal joint.

FRED F. MILLER, JR.

REFERENCES CITED

The following references are of record in the file of this patent:

UNITED STATES PATENTS

| Number | Name | Date |
|---|---|---|
| 1,979,768 | Pearce | Nov. 6, 1934 |
| 2,053,542 | Vandervoort | Sept. 8, 1936 |
| 2,426,701 | Miller, Jr. | Sept. 2, 1947 |

FOREIGN PATENTS

| Number | Country | Date |
|---|---|---|
| 104,629 | Switzerland | of 1924 |
| 661,770 | Germany | of 1938 |